3,222,150
METHOD OF MAKING GLASS-TO-METAL SEALS
Robert N. Shepard, Pine City, N.Y., assignor to Corning Glass Works, Corning, N.Y., a corporation of New York
Filed Mar. 11, 1960, Ser. No. 14,250
2 Claims. (Cl. 65—18)

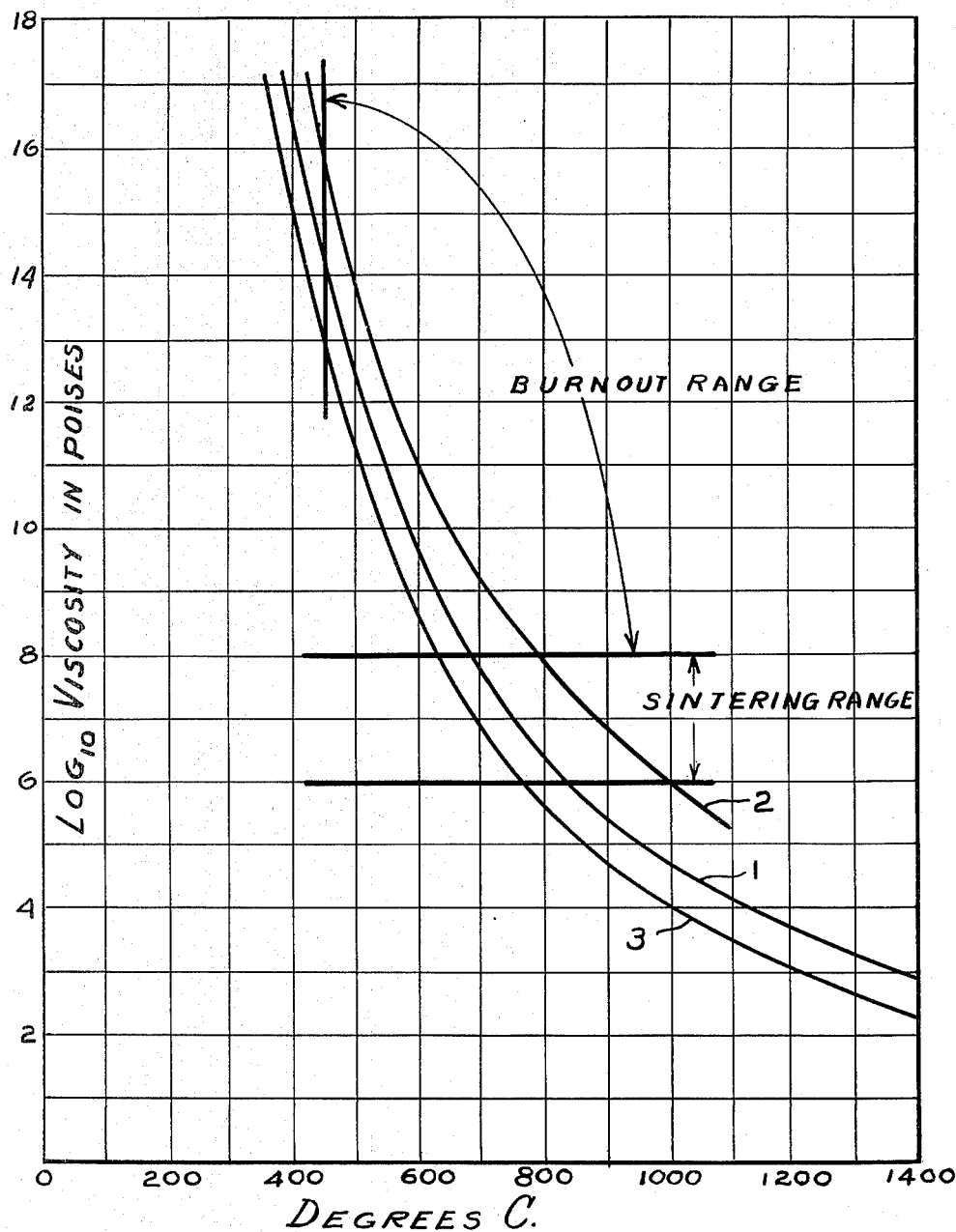

This invention relates to a method of producing glass-to-metal seals between metal elements and glass elements having complex shapes, which are commonly utilized in the manufacture of electronic devices such as transistors, vacuum tubes, cathode ray tubes, and the like.

In the manufacture of many electronic devices, it is necessary to seal metallic elements to preformed glass elements, either to properly hold the elements in a desired location or to provide means for electrical leads to pass through the envelope or container which encloses the device. The glass elements for these applications are usually of complex shapes which do not lend themselves to standard glass-forming techniques involving working from the melt and, therefor, are conventionally produced by sintering pulverized glass which has been formed to the desired shape by extruding or pressing a mixture of powdered glass and organic material. Thus, tubes or beads having the desired number of holes therein through which the required lead or leads may pass and the outside dimension of the elements are such as to fit within the opening in the body of the container may readily be formed in this manner. Likewise, bars of the desired shape for use as supports for gun mounts in cathode ray tubes may be advantageously formed in this manner. Such parts are thereafter sealed to the metal element by heating the glass to a softened condition so that it will fuse to the metal. The glass may also be simultaneously or subsequently heated to fuse it to the container.

However, glass elements produced by the conventional process are opaque and can bloat or expand during the sealing operation. These disadvantageous characteristics make inspection of the seal line between the glass and the metal impossible and could produce seals which leak or become unjoined. Ordinarily, when seals are produced between metal and glass, an oxide film forms on the metal surface in contact with the glass and stresses are set up in the glass as the joined elements are cooled from the sealing temperature. While operating conditions can be achieved which will regulate the quality of the oxide coating and the amount of stress within the glass portion of the seal, there is no positive or direct means for checking the resultant seal to insure that a proper seal has been achieved because the glass elements have heretofore been opaque. Furthermore, such prior glass elements bloated or expanded during the sealing causing problems with dimensional control of the articles.

The principal object of this invention is to produce sintered glass elements for sealing to metals to form more reliable seals, especially for electronic devices.

Another object is to produce a seal between a metal and a sintered glass element wherein the glass-metal interface may be inspected.

Another object is to produce a seal between a metal and a sintered glass element wherein the resultant stress may be determined by inspection with a polaroscope.

A still further object of this invention is to produce a seal between a metal and a sintered glass element wherein the glass element substantially maintains its dimensions during sealing.

I have found that these objects may be achieved by utilizing glass elements produced by firing the preformed glass elements in an oxidizing atmosphere at an elevated temperature but below the sintering temperature to completely remove the organic binder, and thereafter sintering the pulverized glass in a surrounding atmosphere substantially below atmospheric pressure.

The preformed glass elements are made in the conventional manner by intimately mixing finely divided glass particles with a small amount of organic binder or forming-aid, on the order of about 0.5% to 10% by weight of the total mixture, and thereafter forming the mixture to the desired configuration by a suitable process such as extrusion or, preferably, by die pressing.

The firing is the critical feature of my process; it being necessary that it be performed in two separate and individual steps. The first step comprises heating the preformed element slowly from room temperature to a temperature of 450° C. or higher, but below the temperature at which the viscosity of the glass is less than $10^8$ poise. The article must be heated slowly, that is at an average rate of about 15° C./min. or less, preferably 4.5° C./min., to allow the organic material to volatilize and/or oxidize and thereby be completely removed from the structure. Too rapid heating causes decomposition of the organic material thereby forming a black, charcoal-like deposit within the body which is difficult, if not impossible, to remove.

The removal of the organic material is not completely effected at temperatures of less than about 450° C. and, therefore, it is necessary to heat the body in the oxidizing atmosphere for at least 1 hour at such an elevated temperature to completely remove the organic material. Temperatures above 450° C. speed the removal, but are limited by the tendency of the pulverized glass to sinter, especially on the surface, thereby preventing further volatilization of the binder within the body and causing the body to foam upon subsequent treatment. I have found that this tendency to sinter occurs at a temperature at which the glass has a viscosity of about $10^8$ poise.

Upon completion of the removal of the binder, the body is placed in a vacuum furnace which is at a temperature less than that which causes the glass to sinter and the surrounding atmosphere is evacuated to a pressure of 2 mm. of mercury or less. The temperature of the body is then increased to a temperature within the sintering range. By sintering range, I means the temperature range at which the viscosity of the glass is between $10^6$ and $10^8$ poise. Under these conditions sintering takes place quickly; it being necessary to maintain the article in the sintering range for about 10 minutes at the higher end of the range to about 60 minutes at the lower end of the range. The sintering range is critical as sintering will not occur if the glass has a viscosity in excess of $10^8$ poises whereas the powdered glass body will flow or slump out of shape if the viscosity thereof decreases below $10^6$ poises, introducing distortion which precludes using the product for its intended purpose. After the sintering has been completed, the vacuum is broken and the article is removed from the furnace.

More specifically, a suitable glass for the practice of the above described method is a baria-alumina-borosilicate glass, hereinafter referred to as Glass No. 1, which has a softening point of about 710° C., an annealing point of about 480° C., and a strain point of about 440° C. The glass, having been made by melting under usual conditions, is pulverized so that about 75% passes through a 200 mesh screen and is intimately mixed with 0.5–10%, preferably 6%, of a suitable organic forming-aid or binder, such as a polyethylene glycol having an average molecular weight of about 6000. The mixture is then formed to a body of the desired shape by placing it in a die and pressing it under a pressure of about 2,000 p.s.i. The body is then placed in a burn-out furnace and heated in about 30 minutes to a temperature of 450–550° C., preferably 475° C., and then held in the burn-out temperature range for about 100 minutes. Air is allowed to circulate within the furnace to maintain the atmosphere therein in an oxidizing condition throughout the burn-out step. The burned out body is then loaded in a vacuum furnace which has been pre-heated to 600° C. and the pressure within is reduced to less than 2000 microns of mercury, preferably about 5 microns. The temperature is then increased to about 740° C. at furnace rate, and held at such temperature for about 12 minutes. The furnace is then back-filled to increase the pressure within to atmospheric conditions and the body is removed therefrom.

The bodies produced in this manner are particularly suitable as glass sealing-beads as they have a very high density, nearly equal to the density of homogeneous glass formed from the molten state, which remains constant or even increases only slightly upon subsequent heating to a softened condition when utilized in a sealing operation. Thus, glass sealing beads produced by the above-described preferred method have a density of about 2.27 after sintering and a density of about 2.28, the ultimate density of the parent glass, after heating to the softened condition as is done in making seals therewith. By comparison, beads sintered in the conventional manner of heating to 740° C. in air under atmospheric pressure and cooling to room temperature in a 2 hour cycle, have corresponding densities of about 2.23 and 2.15, respectively. My improved method, therefore, results in a body which changes in density by only about 0.4% during the sealing operation as compared to a change of about 3.5% for prior bodies. Furthermore, I have found that the change in density of beads produced in accordance with my method is much more uniform, being only on the order of 0–0.5% increase as compared with the product resulting from prior methods wherein the density decreases by from 2.0–5.0% during use in sealing operations.

A potassia-borosilicate glass, hereinafter referred to as Glass No. 2, having a softening point of about 820° C., an annealing point of about 515° C. and a strain point of about 465° C. is prepared and formed as described above. The binder or forming-aid is removed by heating in an oxidizing atmosphere of air at a temperature of 525° C. and thereafter is sintered at 850° C. in about 20 minutes.

An alkali-baria-alumino silicate glass, hereinafter referred to as Glass No. 3, having a softening point of about 650° C., an annealing point of about 445° C., and a strain point of about 405° C., is prepared and formed as described above. The burn-out is accomplished at a temperature of about 450° C. and the sintering is accomplished at a temperature of 690° C. in about 15 minutes.

The accompanying drawing sets forth viscosity curves for each of the three above glasses. This drawing illustrates the viscosity relationship for the burn-out step and the sintering step of my improved method.

The terms "strain point" and "annealing point," as recently redefined by the American Society for Testing Materials, mean the temperature at which glass has a viscosity of $10^{14.5}$ and $10^{13.0}$ poises, respectively, and "softening point" means the temperature at which glass has a viscosity of $10^{7.6}$ poises, Jour. Am. Cer. Soc., vol. 14, pages 502–511 (1931).

The method of forming the body to the desired shape and the binders utilized therefore, as well as other materials incorporated therein for subsidiary functions, do not affect the practice of my improved process, and therefore, a wide variety of binders, oxidizing agents, lubricants, and the like, as described in U.S. Patent No. 2,390,354, may be utlized in my presently described method.

Although the sintering temperatures for the glasses described in the examples set forth above are the preferred temperatures to produce the most desirable product in the shortest period of time, it is apparent that somewhat lower temperatures, within the limitations set fore above, may be utilized if maintained for longer times. Thus Glass No. 1 may be sintered at a temperature of about 700° C. in about 40 minutes or at about 685° C. in about 60 minutes. Likewise, Glass No. 2 may be sintered in about 40 minutes and about 60 minutes at temperatures of about 820° C. and about 795° C., respectively, and Glass No. 3 may be sintered in like times at temperatures of about 655° C. and about 640° C., respectively.

The glass-to-metal seals formed from glass elements produced as described above not only produce seals which appear to be stronger and less subject to leaking, but it is possible to inspect them. Thus, a visual observation of the seal will reveal if the oxide coating on the metal surface is adherent and of suitable thickness or if it is flaking off or too thick, thereby being apt to leak or fail when the device incorporating such a seal therein is utilized. It is also possible to examine the seal in a polaroscope to determine if stresses have been developed in the glass element which will cause failure of the seal.

What is claimed is:

1. In the method for producing a glass-to-metal seal which comprises forming a sintered glass element from a mixture of finely-divided glass particles and organic forming-aid which is shaped to the desired configuration and heated in an oxidizing atmosphere to a temperature sufficiently high to burn out the organic material and sinter the glass particles to a unitary structure, and thereafter softening the glass element in juxtaposition with a metal element and cooling to seal the elements together, the improvement which comprises forming the sintered glass element by heating the shaped mixture of glass particles and organic forming-aid in an oxidizing atmosphere at a rate not exceeding about 15° C./minute to a temperature of at least about 450° C., but less than that temperature at which the glass has a viscosity less than $10^8$ poises, maintaining thereat for at least one hour to completely burn out all of the forming-aid, thereafter exposing the shape to a temperature within the range at which the viscosity of the glass is between $10^6$ and $10^8$ poises in a surrounding atmosphere having a pressure of less than 2000 microns of mercury for a period of time varying from about 10 minutes at the higher end of the temperature range to about 60 minutes at the lower end of the temperature range to sinter the body to a substantially transparent unitary structure.

2. In the method for producing a sintered glass body comprising mixing together finely-divided glass particles and an organic forming-aid, shaping the mixture to a body of the desired configuration, and heating said body in an oxidizing atmosphere to remove the forming-aid and sinter the body to a unitary structure, the improvement which comprises heating the body shaped from the glass particles and forming-aid in an oxidizing atmosphere at a rate not exceeding about 15° C./minute to a temperature of at least about 450° C., but less than that temperature at which the glass has a viscosity less than $10^8$ poises, maintaining thereat for at least one hour to completely burn out all of the forming-aid, thereafter exposing the body to a temperature within the range at which the viscosity of the glass is between $10^6$ and $10^8$ poises in a surrounding atmosphere having a pressure of less than 2000 microns of mercury for a period of time varying from about 10 minutes at the higher end of the temperature range to about 60 minutes at the lower end of the temperature range to sinter the body to a substantially transparent unitary structure.

References Cited by the Examiner

UNITED STATES PATENTS

| | | | |
|---|---|---|---|
| 2,114,545 | 4/1938 | Slayter | 65—21 |
| 2,175,019 | 10/1939 | Edwards | 65—18 X |
| 2,390,354 | 12/1945 | Clapp | 65—17 |
| 2,894,294 | 7/1959 | Prescott | 65—59 X |
| 2,930,098 | 3/1960 | Emeis | 65—18 |

DONALL H. SYLVESTER, *Primary Examiner.*
CHARLES R. HODGES, *Examiner.*